United States Patent
Yao

(10) Patent No.: US 7,895,607 B2
(45) Date of Patent: Feb. 22, 2011

(54) METHOD FOR DISPLAYING AND FORMATTING MESSAGES IN WEB APPLICATIONS USING JAVASERVER FACES

(75) Inventor: Albert Z. Yao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1147 days.

(21) Appl. No.: 11/555,874

(22) Filed: Nov. 2, 2006

(65) Prior Publication Data

US 2008/0109738 A1  May 8, 2008

(51) Int. Cl.
G06F 3/00 (2006.01)
G06F 9/44 (2006.01)
G06F 9/46 (2006.01)
G06F 13/00 (2006.01)

(52) U.S. Cl. .................. 719/320; 719/313; 719/315

(58) Field of Classification Search ................. 719/320, 719/313, 315
See application file for complete search history.

(56) References Cited

PUBLICATIONS

Mahmoud, Developing Web Applications with JavaServer Faces, Sun Microsystems, Inc., Aug. 2004, pp. 1-14.*
Bergsten, JavaServer Faces, O'Reilly Media, Inc., 2004, 21 pages.*
Cioroianu, Using JSF, OnJava.com, Sep. 3, 2003, pp. 1-20.*
Falkman, Customizing the Look of Error Message in JSP, Feb. 22, 2002, pp. 1-4.*

* cited by examiner

*Primary Examiner*—Diem K Cao
(74) *Attorney, Agent, or Firm*—Jill Poimboeuf; Jeffrey L. Streets

(57) ABSTRACT

Methods, machine-accessible media, and systems for displaying and formatting messages in web applications using JavaServer Faces (JSF). A JSF FacesMessage is intercepted before the FacesMessage is sent to a JSP page for display. The FacesMessage may be intercepted by a phase listener monitoring the JSF phases to obtain information from the message. The method may also be extended to handle application-specific messages. A managed bean receives the message information and creates a JSP page segment that provides formatting to the information. The newly created JSP page segment is then displayed in the JSP page instead of the FacesMessage. Preferably, the formatting within the JSP page segment includes additional content selected from a message icon, a message identification code, an additional message segment, and combinations thereof. Furthermore, the JSP page segment may optionally provide advanced features, such as clickable image links for additional information or help.

20 Claims, 7 Drawing Sheets

Import Model

Validation Error: Value is required. —56

This page provides option entries for importing a mining model from client to the server.

Provide information required in this form and click the 'Import' button to import a model.

Model Name: [                    ]
Model Type: [ Association ▼ ]    Validation Error: Value is required —58
Model File:  [                    ] [ Browse... ]
Model Description: [            ]

[ Back ]   [ Import ]

— 50

52 —
```
<h:messages styleClass="messages_error"
    id="messages1" >
</h:messages>
```

54 —
```
<h:message styleClass="message" id="mesModelName"
    for="iModelName"
    showDetail="false" showSummary="true"
    errorClass="messages_error" >
</h:message>
```

FIG. 3

Import Model — 70

76 — ⊗ DWE3120E
Validation Error is detected for field "Model Name".
Value is required. — 78

74

This page provides option entries for importing a mining model from client to the server.

Provide information required in this form and click the 'Import' button to import a model.

Model Name: [____] *— 81
Model Type: [Association ▼]
Model File: [_____]
Model Description: [_____]

[Browse...]

[Back] [Import]

80

72 —
```
<jsp:include page="../dwecom/Message.jsp"
             flush="true" >
</jsp:include>
```

```
<h:message styleClass="message" id="mesModelName"
           for="iModelName"
           showDetail="false" showSummary="true"
           errorClass="messages_error" >
</h:message>
```

*FIG. 5*

```
                        ┌─────────────────────────────────────────┐
                        │           DWEMessage                 ▶  │
                        ├─────────────────────────────────────────┤
                        │ □ clientId : String = "GENERIC DWE MESSAGE" │
                        │ ◇ display : boolean = false             │
                        │ ◇ displayOrig : boolean = false         │
                        │ ◇ exc : DWEAdminException               │
                        │ ◇ msgId : String                        │
                        │ ◇ image : String = "error.gif"          │
                        │ ◇ displayMsg : String                   │
                        │ ◇ locale : Locale                       │
                        │ ◇ resource : String                     │
                        │ ◇ originalMsg : String                  │
                        │ □ msg_sep : String = "$$$"              │
                        └─────────────────────────────────────────┘
```

*FIG. 6A*

*FIG. 6B*

METHOD FOR DISPLAYING AND FORMATTING MESSAGES IN WEB APPLICATIONS USING JAVASERVER FACES

BACKGROUND OF THE INVENTION

1. Field of the Invention

The present invention relates to displaying and formatting messages in a web application developed using JavaServer Faces (JSF).

2. Description of the Related Art

In the Java 2 Platform, Enterprise Edition (J2EE), Web components like Java servlets and JavaServer Pages (JSP) provide dynamic extension capabilities for a Web server. Servlets are Java programming language classes that dynamically process requests and construct responses. JSP pages are text-based documents that execute as servlets, but allow a more natural approach to creating static content. Although servlets and JSP pages can be used interchangeably, each has its own strengths. Servlets are best suited for service-oriented applications and the control functions of a presentation-oriented application, such as dispatching requests and handling non-textual data. JSP pages are more appropriate for generating text-based markup such as HTML, Scalable Vector Graphics (SVG), Wireless Markup Language (WML), and XML.

Web components are supported by the services of a runtime platform called a web container. A container provides an interface between the component and low-level platform-specific functionality that supports the component. Before a web component, enterprise bean, or application client component can be executed, it must be assembled into a module and deployed into its container. A Web container manages the execution of JSP page and servlet components for J2EE applications. More specifically, a web container provides services, such as request dispatching, security, concurrency and lifecycle management, and provides web components with access to application programming interfaces (APIs), such as naming, transactions, and email. Both the web components and their container run on the web server. When the web server runs the Java 2 Platform, Enterprise Edition (J2EE), it may be referred to as a J2EE server.

Since the introduction of Java Servlet and JSP technology, additional Java technologies and frameworks for building interactive web applications have been developed. JavaServer Faces (JSF), for example, is becoming the new standard for building server-side user interfaces for Web applications. JavaServer Faces technology includes a set of APIs for representing user interface (UI) components and managing their state, handling events and input validation, defining page navigation, and supporting internationalization and accessibility. A JavaServer Pages (JSP) custom tag library is also included for expressing a JavaServer Faces interface within a JSP page.

FIG. 1 is a schematic diagram of a prior art Web application server 10 in communication with a Web client 12 over a network 14, such as the Internet. The client sends an HTTP request 16 to the web server and receives an HTTP response 18 over the network. The web server 10 implements a Java Servlet component 20, a JavaServer Pages component 22, and a JavaServer Faces component 24 (including a JavaServer Pages standard tag library 26) in a web container 28. These web components can interact with JavaBean components 30, a database 32, or both to generate dynamic content. The web components can then generate a response or pass the request to another web component for response. Eventually one of the web components, in conjunction with the web server 10, generates the HTTP response 18 and returns it to the client 12.

FIG. 2 is a schematic diagram of prior art JSF process 40 including JSF phases 42 that result in a FacesMessage object 44 being sent to a JSP page 46. In JSF, messages are handled through a FacesMessages object 44 and the information in the message is displayed in a JSP web page 46 using <h:message> and <h:messages> tags.

However, JSF tags provide very little flexibility for formatting the message for display. For example, FIG. 3 is an illustration of a graphical display 50 produced by a JSP page having received prior art FacesMessages 52, 54 generated in accordance with FIG. 2. The FacesMessages 52, 54 are displayed as text in messages 56, 58, respectively.

However, it is very difficult to satisfy the dynamic formatting requirements of advanced web applications using existing JSF methods. Therefore, there is a need for a method to display messages in an easy, formattable manner. It would be desirable to have a method that combines the simplicity of using FacesMessage with advanced display and formatting features.

SUMMARY OF THE INVENTION

The present invention provides a method of displaying and formatting messages in a web application developed using JSF and a machine-accessible medium containing instructions, which when executed by a machine cause the machine to perform operations in accordance with the method. The method comprises the steps of intercepting a JSF FacesMessage before the FacesMessage is sent to a JSP page for display, interpreting the message information in the FacesMessage, creating a JSF managed bean for storing the interpreted message information, creating a JSP page segment that provides formatting to the interpreted message information, and displaying the JSP page segment in the JSP page instead of the FacesMessage. Preferably, the formatting within the JSP page segment includes additional content selected from a message icon, a message identification code, and an additional message segment. Furthermore, the formatting within the JSP page segment may optionally include a clickable image link, such that the method may further comprise displaying an additional message segment related to the information upon activation of the clickable image link.

In a preferred embodiment, the step of intercepting a JSF FacesMessage includes monitoring JSF phases. In one embodiment, the method further comprises sending the JSF FacesMessage to the JSP page for display using the <h:message> or <h:messages> command in a separate segment from the JSP page segment that was created. Optionally, the JSF FacesMessage is used to point to a component related to the information in the JSP page segment.

The invention also provides a system for displaying messages. The system comprises a phase listener for intercepting a JSF FacesMessage before the FacesMessage is sent to a JSP page for display, a Managed Bean for creating a JSP page segment that formats information from the FacesMessage, and a JSP page configured to display the JSP page segment instead of the FacesMessage. Optionally, the Managed Bean may format the JSP page segment to include additional content selected from a message icon, a message identification code, and an additional message segment. Furthermore, the Managed Bean may format the JSP page segment to include a clickable image link, wherein an additional message segment related to the information is displayed upon activation of the clickable image link. Preferably, the PhaseListener monitors JSF phases.

In one embodiment of the system, the JSP page also displays the JSF FacesMessage in a separate segment outside the JSP page that was created. In another embodiment, the JSP page displays a pointer directed at a component related to the information in the JSP page segment, wherein the pointer is outside the JSP page segment that was created. The system will typically include a web application server running a Java servlet that displays content through JSP.

In yet another embodiment, the invention may process an application specific message to be displayed through one of the foregoing embodiments, such as a method including the steps of intercepting a JSF FacesMessage before the FacesMessage is sent to a JSP page for display, creating a JSP page segment that provides formatting to information from the Managed Bean, and displaying the JSP page segment in the JSP page instead of the FacesMessage. The JSP segment used for displaying the message information can also be further constructed into a custom tag library using the current implementation.

BRIEF DESCRIPTION OF THE DRAWINGS

FIG. 3 is a diagram of a graphical display produced by a JSP page having received the prior art FacesMessage of FIG. 2.

FIG. 5 is a diagram of a graphical display produced by a JSP page having received the JSP page segment of FIG. 4.

FIG. 6A is a list of attributes made available by the MessageBean.

FIG. 6B is an illustration of a formatted message including an "Additional Information" display for displaying all attributes.

DETAILED DESCRIPTION

The present invention provides improved methods, machine-accessible media, and systems for displaying and formatting messages in web applications using JavaServer Faces (JSF). A JSF FacesMessage is intercepted before the FacesMessage is sent to a JSP page for display. The FacesMessage may be intercepted by a phase listener that monitors the JSF phases in order to obtain information from the message. A Managed Bean receives the message information and creates a JSP page segment that provides formatting to the information. The newly created JSP page segment is then displayed in the JSP page instead of the FacesMessage. Preferably, the formatting within the JSP page segment includes additional content selected from a message icon, a message identification code, and an additional message segment. Furthermore, the formatting within the JSP page segment may optionally include a clickable image link, such that the method may further comprise displaying an additional message segment related to the information upon activation of the clickable image link. Certainly, the formatting may include the use of borders, background colors, fonts, images, style classes and other well known formatting capabilities.

Optionally, the JSF FacesMessage may still be used in some instances or for other purposes. For example, the FacesMessage may be used for display in the same or different JSP page using the <h:message> or <h:messages> command in a segment other than the newly created JSP page segment. Optionally, the FacesMessage is used to point to a component related to the information in the JSP page segment.

In one embodiment, a message display flag is enabled when the phase listener detects a FacesMessage or by directly accessing an enableMsgs method in the message bean. The flag is detected by the message bean such that the flag controls the rendering of the message as a JSP page segment. Accordingly, the JSP page segment containing the message will only be displayed when this flag is enabled.

The method is preferably carried out in a web application server for providing a web client with access to a web application. The web application includes a Java servlet that is supported by Java (such as the Java 2 Platform, Enterprise Edition (J2EE)), JavaServer Pages (JSP), JavaServer Faces (JSF), and a JSP Standard Tag Library (JSTL), which are all deployed in a web container installed on the web application server. The Web application server preferably operates a conventional server software program, such as International Business Machines' WebSphere®, for administering the web application program. The web server may include or communication with a database. The methods and systems described can provide an advanced web application with dynamic content including enhanced message displays.

Figure 4:
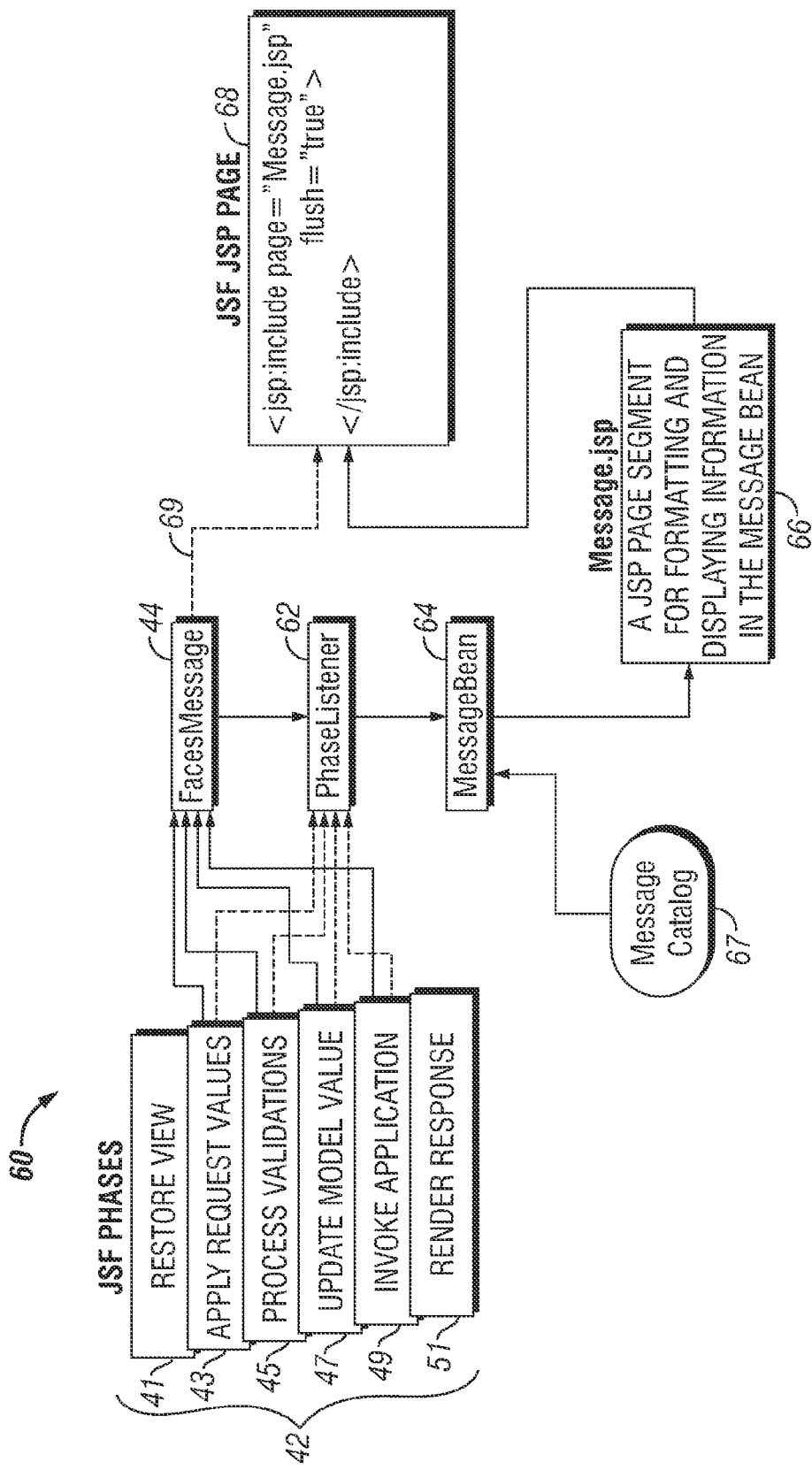
FIG. 4 is a schematic diagram of a PhaseListener and MessageBean that process the information from a FacesMessage to create and send a JSP page segment to a JSP page.

FIG. 4 is a schematic diagram of a method 60 including a PhaseListener 62 and MessageBean 64 that process the information from the FacesMessage 44 to create and send a JSP page segment (Message.jsp) 66 to a JSP page 68. This process facilitates the convenient use of JSF messages while also providing for advanced formatting of the messages and the inclusion of additional content and images.

The detailed examples described herein show only the case for displaying a single message (i.e., the first FacesMessage object detected by a PhaseListener for each request). However, the present invention encompasses the interpreting and displaying of multiple messages in a JSP page if multiple FacesMessages are generated for each request.

The JSF phases 42 include Restore View 41, Apply Request Values 43, Process Validations 45, Update Model Value 47, Invoke Application 49, and Render Response 51. The PhaseListener 62 monitors the application level phases 43, 45, 47, 49, receives a copy of the information in the FacesMessage object 44, and provides this information to the MessageBean 64, which is a JSF managed bean. The MessageBean 64 may then include the information along with formatting instructions and other optional information into a JSP page segment (Message.jsp) 66 that is included in a JSP page 68. As shown by line 69, the FacesMessage 44 may also be used in a more conventional manner at another point in a JSP page.

Faces messages can be generated in any of the JSF phases 42, but validation and conversion messages are usually generated in the Process Validation phases. Application specific messages are added in the Invoke Application phases 49 and are generated in the form of FacesMessage objects 44. The PhaseListener 62 monitors all events and FacesMessages generated, and determines whether the message is a system message generated by system validation or whether the message is an application specific message generated by an application implementation. The PhaseListener then sets the proper information to the MessageBean 64. The MessageBean 64 parses the information in the FacesMessage and fetches information (such as message ID, message, message icon link, additional message, etc.) needed in formatting the display. For example, the MessageBean 64 may extract a message specific to the client language from a message catalog 67 and store the message for formatting and display. A JSP page segment 66 is constructed to display the information obtained from the MessageBean 64 in a more controllable format based on customer requirements. New display styles can be added to this JSP page segment. This JSP page segment 66 can be embedded to any JSF JSP page 68 to display any possible messages generated from the system and/or the application.

An exemplary PhaseListener 62 may be implemented as follows:

```
public void beforePhase(PhaseEvent e) {
    FacesContext fc = e.getFacesContext( );
    UIViewRoot root = fc.getViewRoot( );
    String mbName = fc.getApplication( ).getMessageBundle( );
//get client locale
    Locale locale = root.getLocale( );
//get the message bean handle
    DWEMessage dweMsg =
        (DWEMessage) fc.getApplication( ).createValueBinding(
            "#{dweMsg}").getValue(fc);
//set client locale to the message bean for this request
    dweMsg.setLocale(root.getLocale( ));
    dweMsg.setDisplay(false);
//Find possible FacesMessage and its associated component ID
    Iterator iter1 = fc.getClientIdsWithMessages( );
    String detail;
    String msg;
    boolean doneMsg = false;
    FacesMessage fmsg;
    UIComponent comp;
    String compName, fieldDesc;
    while (iter1.hasNext( )) {
        String clientid = (String) iter1.next( );
        Iterator iter2 = fc.getMessages(clientid);
        while (iter2.hasNext( )) {
            fmsg = (FacesMessage) iter2.next( );
            if (doneMsg) {
                fmsg.setSummary("");
            } else {
                detail = fm.getDetail( );
                if (clientid.equals(DWEMessage.clientId)) {
//set information to message bean for the application specific message
//which is identified by a generic component id defined in
//DWEMessage.clientId
                    msg = fmsg.getSummary( );
                    dweMsg.enableMsgs(msg, detail);
                } else {
//extract and set information for system validation messages
                    compName = clientid;
                    comp = root.findComponent(clientid);
                    if (comp != null) {
//extract additional attribute for describing the specific
//component
                        fieldDesc =
                            (String)
comp.getAttributes( ).get("field_desc");
                        if (fieldDesc != null) {
                            compName = fieldDesc;
                        }
                    } //done if comp!=null
                    dweMsg.enableFacesMsgs(compName, detail);
                    fmsg.setSummary("*");
                }
                doneMsg=true;
            } //done if(doneMsg)
        } //done while(iter2)
    } //done while (iter1)
}
```

A typical message contains: (1) a message ID, (2) a default message, (3) possible parameters for substituting in a real translated message from a message catalog, (4) additional detail messages, and (5) the severity of the message. However, the FasesMessage object only contains two fields, i.e., a summary field and a detail field, in which to save this information from the message. Accordingly, this information is concatenated into a single string. The message bean may execute a method for composing substitute parameters, a message ID, and a summary message string. One example of such a method is as follows:

```
/*
 * Compose the substitute parameters and message ID into a composed
 * summary message string.
 *
 * @param id - The message ID.
 * @param pars - The array of substitute parameters for this message.
 * @return String - The composed summary message string.
 */
    public String composeSummaryMsg(String id, String[ ] pars) {
        String str = id;
        if(pars != null) {
            for(int i=0; i<pars.length; i++) {
                str += msg_sep;
                str += pars[i];
            }
        }
        return str;
    }
/*
 * Compose the default message and additional message into a composed
 * detail message string.
 *
 * @param defMsg - The default message.
 * @param addMsg - The additional message.
 * @return String - The composed detail message string.
 */
    public String composeDetailMsg(String defMsg, String addMsg) {
        String str = defMsg;
        if(oriMsg != null ) {
            str += msg_sep;
            str += addMsg;
        }
        return str;
    }
```

An application specific message (or custom application message) can be composed and added by an application. An exemplary method for generating an application specific message may be implemented as follows:

The DWEMessage.clientId is the generic component ID defined for custom application message.

```
/*
 * Add a new FacesMessage with message parameter substitution
 * and secondary message
 *
 * @param id The message ID of the message
 * @param pars The array of parameters
 * @param defmsg The default message for this message ID
 * @param addgmsg The additional messages to be displayed
 */
public void addDWEFacesMessage(
        String id,
        String[ ] pars,
        String defmsg,
        String addmsg)
{
    String summary = DWEMessage.composeSummaryMsg(id, pars);
    String detail = DWEMessage.composeDetailMsg(defmsg, addmsg);
    FacesMessage fmsg = new FacesMessage(summary, detail);
    FacesContext context = FacesContext.getCurrentInstance( );
    context.addMessage(DWEMessage.clientId, fmsg);
}
```

After the PhaseListener 62 has intercepted the FacesMessage, the PhaseListener then assigns the information, including the composed summary message string, the detail message string, and the client locale. A flag in the message bean for controlling whether to display the message will be set to "true." The enableMsg method in the MessageBean 64 will be called, and this method may then de-compose the summary message string and the detail message string based on the rules used for composing these strings in composeSummaryMsg and composeDetailMsg methods. Accordingly, the message bean is able to extract (1) the message ID, (2) the default message, (3) the possible parameters for substituting in a real translated message from a message catalog, and (4) the additional detail messages. A message catalog 67 may be loaded based upon the client locale so that the MessageBean 64 can extract translated messages consistent with the client locale for display.

In response to receiving message information from the FacesMessage 44 via the PhaseListener 62, the Message Bean 64 makes the following attributes available for extraction and display:

| Attribute | Description of the Attribute |
| --- | --- |
| display | This flag indicates whether there is a message available for display. |
| displayOrig | This value is set to "true" if there is an additional message available for display. |
| msgId | The message ID for the message to be displayed. |
| image | The associated image icon link based on the severity of the message. |
| displayMsg | The message to be displayed based on client locale. If a specific message is not in the message catalog for the client locale, then the default message will be used. |
| originalMsg | The additional message for display. |

These message attributes can be used by a JSP page segment 66. An exemplary JSP page segment is as follows:

```
<f:loadBundle basename="com/ibm/dwe/nls/dwerc" var="rc" />
<script language="JavaScript1.2" type="text/javascript">
<!--
    function toggleMsg(divID) {
        var msgDiv = document.getElementById(divID);
        var imgObj = document.getElementById("dweDetailImg");
        if(msgDiv != null) {
            var currentVisibility = msgDiv.style.visibility;
            if(currentVisibility == "visible") {
                msgDiv.style.visibility = "hidden";
                msgDiv.style.display = "none";
                imgObj.src="/dweadm/images/menu_plus.gif";
            }
            else {
                msgDiv.style.visibility = "visible";
                msgDiv.style.display = "block";
                imgObj.src="/dweadm/images/menu_minus.gif";
            }
        }
        return true;
    }
//-->
</script>
<%-- Start Display DWE Messages --%>
    <h:panelGrid styleClass="msgGrid" id="msggrid" columns="2"
rendered="#{dweMsg.display}">
        <hx:graphicImageEx styleClass="graphicImageMsg"
```

-continued

```
id="msgImageEx" value="../images/#{dweMsg.image}"
align="top"></hx:graphicImageEx>
        <h:panelGrid styleClass="panelGrid" id="infogrid"
columns="1" >
            <h:outputText styleClass="outputMsgID"
id="messageID"
                value="#{dweMsg.msgId}" style="font-
weight: bold"></h:outputText>
            <h:outputText styleClass="outputMsgText"
id="messageText"
                value="#{dweMsg.displayMsg}"></h:outputText>
            <h:panelGrid styleClass="panelGrid"
id="detailGrid1" columns="1" rendered="#{dweMsg.displayOrig}">
                <f:verbatim>
                <a id="dweDetailLnk"
                    onclick="toggleMsg('originalMsgDiv');"
style="color: blue; text-decoration: underline">
                    <img id="dweDetailImg"
                        src="/dweadm/images/menu_plus.gif" width="8"
height="8"
                        alt="<c:out
value="${rc.msg_additional_info}"/>"/><c:out
value="${rc.msg_additional_info}"/> </a>
                <div id="originalMsgDiv" style="visibility: hidden;
display: none">
                    <c:out value="${dweMsg.originalMsg}"/>
                </div>
                </f:verbatim>
            </h:panelGrid>
        </h:panelGrid>
    </h:panelGrid>
<%-- End Display DWE Messages    --%>
```

FIG. 5 is an illustration of a graphical display 70 produced by a JSP page 68 having received the JSP page segment 66 in accordance with FIG. 4. The JSP page includes code segment 72 that loads the page segment for display. The page segment displays, for example, as a formatted message 74. The formatted message 74 produced by the JSP page segment includes additional detail (i.e., the identification of the field "Model Name") that was not provided in the prior art message 56 in FIG. 3. This information makes the message more understandable to the user. Furthermore, the formatted message 74 is provided with an error severity icon 76 and an error code 78 that were not provided in the prior art JSF messages. It should be recognized that the JSP page segment could also be provided as a custom extension tag library.

The JSP page also includes a code segment 80 that includes an <h:message> tag in order to display a summary of the FacesMessage 44 as an asterisk "*" 81. In this example, the summary was established as an asterisk "*" by programming within the PhaseListener. The asterisk serves as a pointer indicating which component the error message is related to.

FIG. 6A provides a list of attributes 73 made available by the MessageBean. FIG. 6B is an illustration of a formatted message 75 (similar to the formatted message 74 in FIG. 5) including an "Additional Information" display for displaying all attributes. This information may be helpful to a user in understanding the message.

Figure 7:
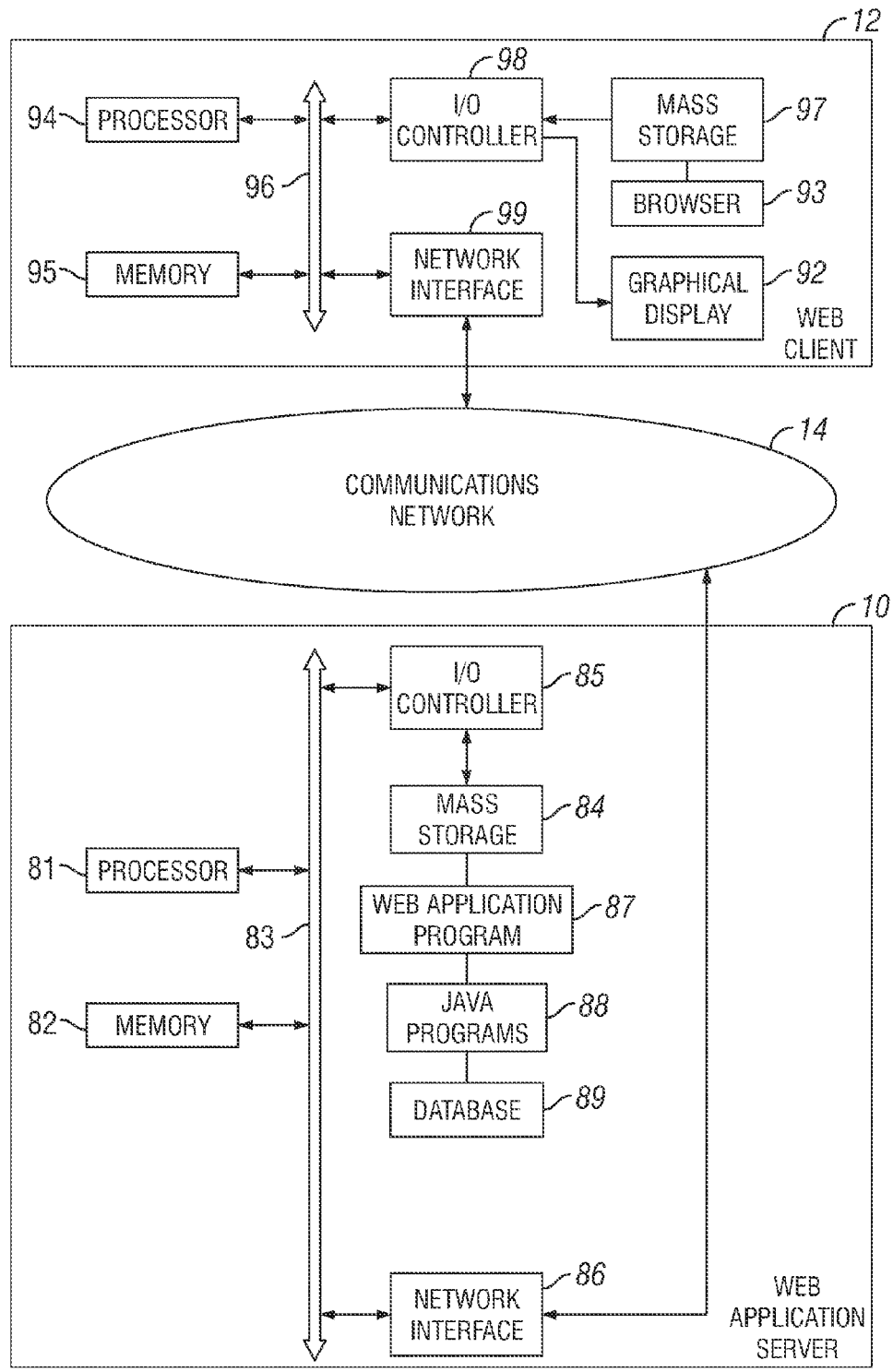
FIG. 7 is a schematic diagram of a client computer system in communication with a Web application server.

FIG. 7 is a schematic diagram of a Web application server 10 in communication with a web client computer 12 through a network 14, such as the Internet. The user's computer 12 includes conventional components such as a processor 94, memory 95 (e.g. RAM), a bus 96 which couples the processor 94 and memory 95, a mass storage device 97 (e.g. a magnetic hard disk or an optical storage disk) coupled to the processor and memory through an I/O controller 98 and a network interface 99, such as a conventional modem. The Web application server system 10 also includes conventional components such as a processor 81, memory 82 (e.g. RAM), a bus 83 which couples the processor 81 and memory 82, a mass storage device 84 (e.g. a magnetic or optical disk) coupled to the processor 81 and memory 82 through an I/O controller 85 and a network interface 86, such as a conventional modem.

It should be appreciated that the present invention may be implemented in software that is stored as executable instructions on a computer readable medium on the Web application server 10, such as in mass storage device 84 or in memory 82. The Web application server system 10 is shown having a Web application server program 87, a Java programs 88 (including a Java servlets, JSP, JSF, JavaBeans, a tag library, a PhaseListener object, and a MessageBean object), and a database 89 stored in mass storage device 84. The Web application server 10 is thus suitable for processing receiving and responding to HTTP requests using JavaServer Faces in a manner that a FacesMessage is obtained by a PhaseListener and provided to a MessageBean for creating a JSP page segment with advanced formatting and additional content or detail in accordance with FIGS. 4 and 5.

Figure 1:
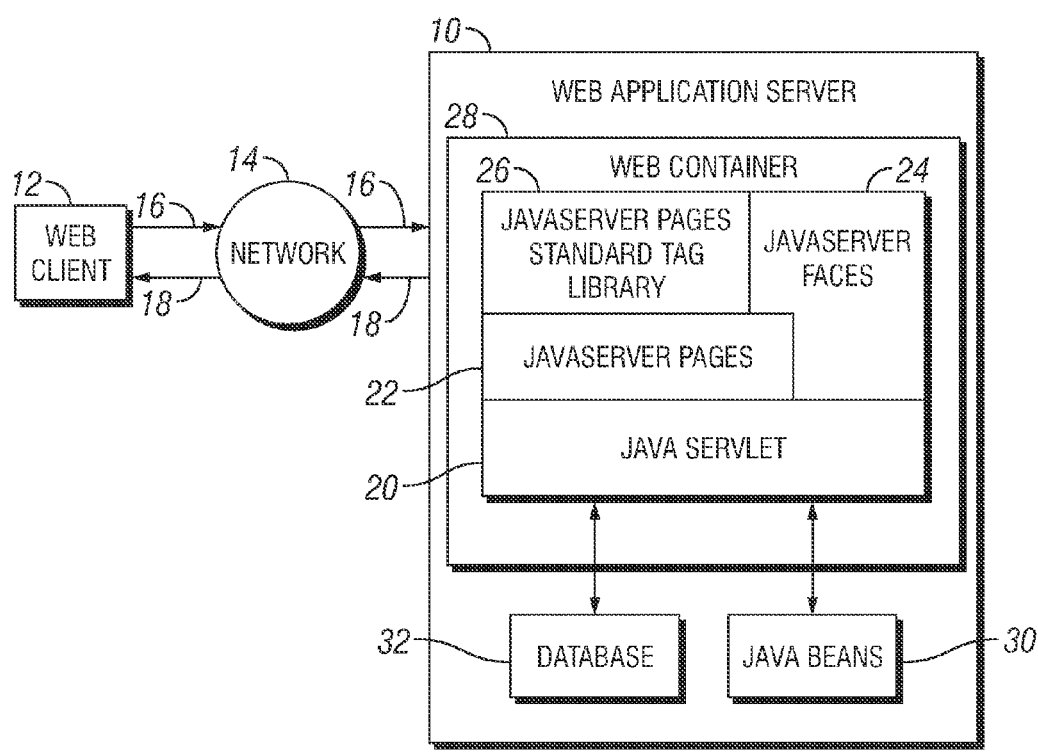
FIG. 1 is a prior art schematic diagram of a Web application server in communication with a Web client over a network.
Figure 2:
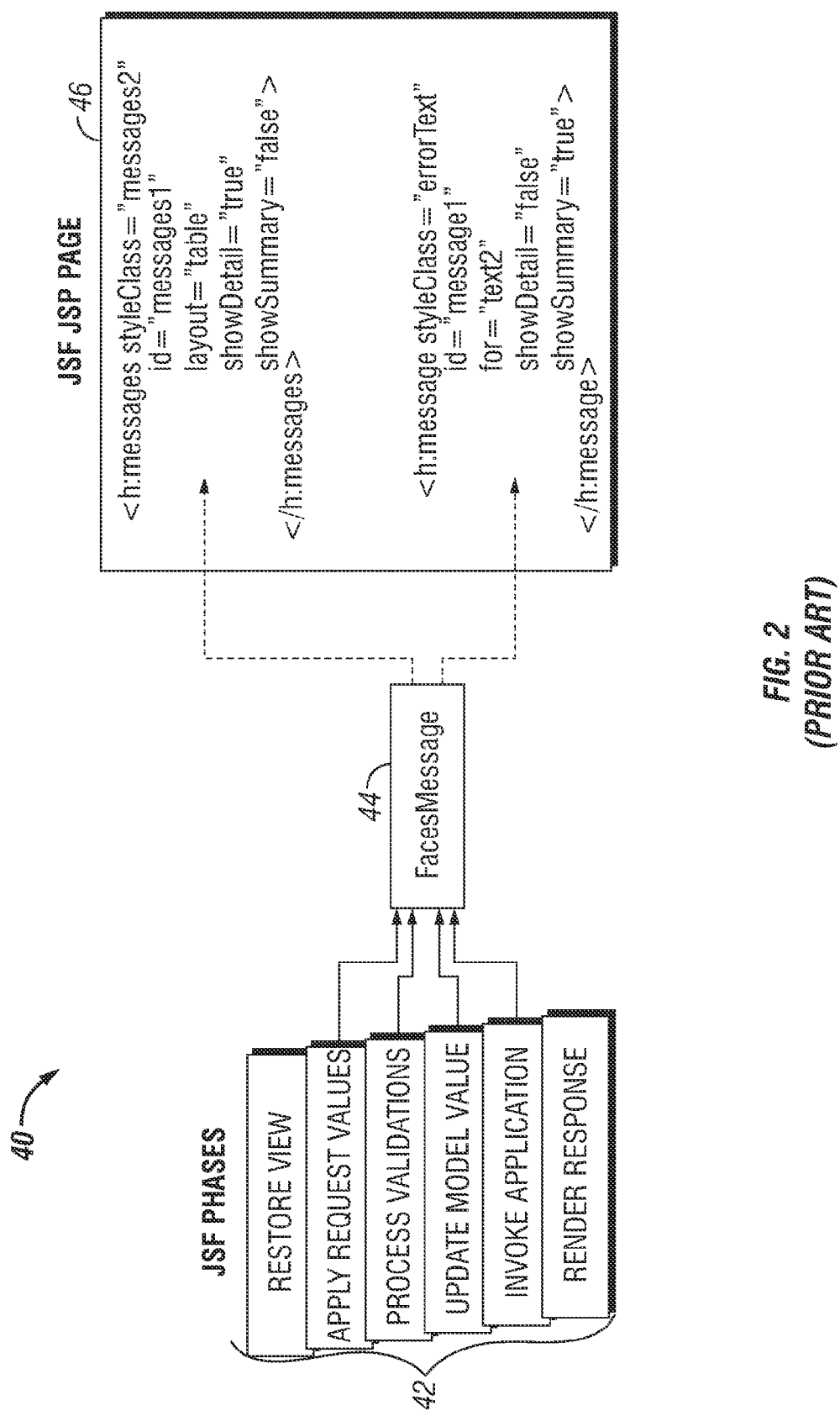
FIG. 2 is a schematic diagram of prior art JSF process including JSF phases that result in a FacesMessage being sent to a JSP page.

The communications network 14 is the medium used to provide communications links between the Web application server 10 and any number of various devices and computers (individually represented as computer 12). The communications network 30 may include permanent connections, such as wire or fiber optic cables, or temporary connections made through telephone or wireless communications. A registered user's computer and the Web application server may be represented by a variety of types of computing devices, such as mainframes, personal computers, personal digital assistants (PDAs), smart phones, etc. The server system may include additional servers, clients, routers and other devices not shown. In the example of FIG. 1, the network system 14 may include the Internet (a worldwide collection of networks and gateways that use the TCP/IP suite of protocols to communicate with one another). Of course, the Web application server 10 may also communicate over a number of different types of networks, such as, for example, an intranet, a local area network (LAN), or a wide area network (WAN).

The present invention can be implemented on a variety of hardware platforms and can be implemented in a variety of software environments. A typical operating system may be used to control program execution within the data processing system. Furthermore, although the preferred embodiment described below includes a "browser" 93 at the registered user's computer as the agent that exchanges data in the security protocols with the Web application server, the agent at the registered user's computer does not have to be a conventional browser, such as Netscape Navigator® or Microsoft Internet Explorer®. In order to optionally secure the information transmitted to and from the server, the user's computer may be capable of Public Key Infrastructure (PKI) technology exchanged in a security protocol such as the Secure Sockets Layer (SSL) version 3.0 and above.

The Web application server 10 preferably operates a conventional server software program 87, such as International Business Machines' WebSphere®, for administering the Web application program. The server software includes application programs that enable the server 10 to manage a web application program.

The computer network 14 may be the Internet, an intranet, or other network. The server 10 may be a Web application server (WAS), a server application, a servlet process or the like. Optionally, the registered user's device 12 submits an HTTP request to the Web application. The application server 10 generates a graphical user interface that is displayed on a graphical display screen 92 by the browser 93 on the device 12.

It should be recognized that the invention may take the form of an entirely hardware embodiment, an entirely software embodiment, or an embodiment containing both hardware and software elements. In particular embodiments, including those embodiments of methods, the invention may be implemented in software, which includes but is not limited to firmware, resident software and microcode.

Furthermore, the invention can take the form of a computer program product accessible from a computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), DVD—read only memory (DVD-ROM), and DVD—read/write (DVD-R/W).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A computer implemented method, comprising:
intercepting a JSF FacesMessage before the FacesMessage is sent to a JSP page for display;
interpreting the message information in the FacesMessage;
creating a JSF managed bean for storing the interpreted message information;
the JSF managed bean creating a JSP page segment that includes the interpreted message information and provides formatting to the interpreted message information; and
displaying the JSP page segment in the JSP page instead of the FacesMessage.

2. The method of claim 1, wherein the formatting within the JSP page segment includes additional content selected from a message icon, a message identification code, and an additional message segment.

3. The method of claim 1, wherein the formatting within the JSP page segment includes a clickable image link, the method further comprising:
displaying an additional message segment related to the information upon activation of the clickable image link.

4. The method of claim 1, further comprising:
sending the JSF FacesMessage to the JSP page for display in a separate segment.

5. The method of claim 4, wherein the JSF FacesMessage is used to point to a component related to the information in the JSP page segment.

6. The method of claim 1, wherein the JSF FacesMessage is an application-specific message created by composing or dispatching a message.

7. The method of claim 6, further comprising:
decomposing the application-specific message.

8. The method of claim 6, further comprising:
incorporating language-specific information into the message.

9. A computer program product including computer usable program code embodied on a computer readable storage medium, the computer program product comprising:
instructions for intercepting a JSF FacesMessage before the FacesMessage is sent to a JSP page for display;
instructions for creating a JSP page segment that includes information from the FacesMessage and formats the information from the Faces Message; and
instructions for displaying the JSP page segment in the JSP page instead of the FacesMessage.

10. The computer program product of claim 9, wherein the instructions for creating a JSP page segment includes instructions for adding content selected from a message icon, a message identification code, and an additional message segment.

11. The computer program product of claim 9, wherein the instructions for creating a JSP page segment includes instructions for adding a clickable image link, and instructions for displaying an additional message segment related to the information upon activation of the clickable image link.

12. The computer program product of claim 9, further comprising:
instructions for sending the JSF FacesMessage to the JSP page for display in a separate segment.

13. The computer program product of claim 9, further comprising:
instructions for displaying a pointer directed to a component related to the information in the JSP page segment.

14. A computer program product including computer usable program code embodied on a computer readable storage medium, the computer program product comprising:
a phase listener for intercepting a JSF FacesMessage before the FacesMessage is sent to a JSP page for display;
a managed bean for creating a JSP page segment that includes information from the FacesMessage and formats the information from the FacesMessage; and
a JSP page configured to display the JSP page segment instead of the FacesMessage.

15. The computer program product of claim 14, wherein the managed bean provides additional content that can be included in the JSP page segment for display, wherein the additional content is selected from a message icon, a message identification code, and an additional message segment.

16. The computer program product of claim 14, wherein the managed bean formats the JSP page segment to include additional content selected from a message icon, a message identification code, and an additional message segment.

17. The computer program product of claim 16, wherein the managed bean provides the additional content without formatting the additional content.

18. The computer program product of claim 14, wherein the managed bean formats the JSP page segment to include a clickable image link, wherein an additional message segment related to the information is displayed upon activation of the clickable image link.

19. The computer program product of claim 14, wherein the phase listener monitors JSF phases.

20. The computer program product of claim 14, further comprising:
a Java servlet that displays content through JSP.

* * * * *